No. 849,054. PATENTED APR. 2, 1907.
E. D. COVENTRY & J. W. ARCHER.
DEVICE FOR HOLDING CLOTHES LINE POLES.
APPLICATION FILED JAN. 24, 1907.
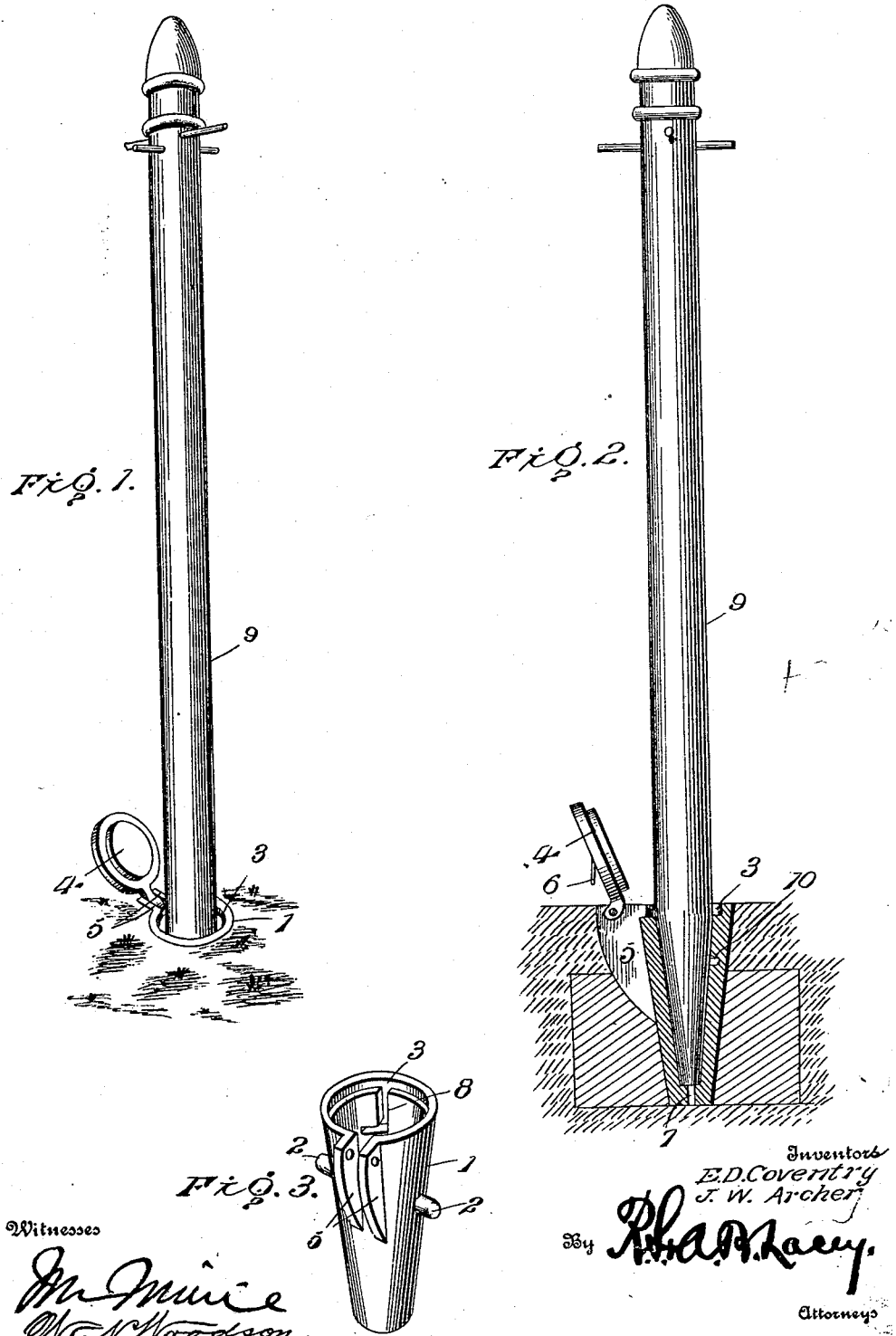

UNITED STATES PATENT OFFICE.

EDWIN D. COVENTRY AND JAMES W. ARCHER, OF BUFFALO, NEW YORK.

DEVICE FOR HOLDING CLOTHES-LINE POLES.

No. 849,054.　　　　Specification of Letters Patent.　　　　Patented April 2, 1907.

Application filed January 24, 1907. Serial No. 353,858.

*To all whom it may concern:*

Be it known that we, EDWIN D. COVENTRY and JAMES W. ARCHER, citizens of the United States, residing at Buffalo, in the county of Erie and State of New York, have invented certain new and useful Improvements in Devices for Holding Clothes-Line Poles, of which the following is a specification.

This invention has for its object a simple and efficient device for holding clothes-line poles in a removable manner, so that the pole may be set up and held securely and rigidly in place on wash-days and then removed when not needed, thereby doing away with the unsightly effect of the standing poles, which are so likely to mar the appearance of a lawn or garden.

With this and other objects in view, as will more fully appear as the description proceeds, the invention consists in certain constructions and arrangements of parts hereinafter described, and particularly pointed out in the appended claim.

For a full understanding of the invention and the merits thereof and also to acquire a knowledge of the details of construction and the means for effecting the result, reference is to be had to the following description and accompanying drawings, in which—

Figure 1 is a perspective view illustrating our invention applied. Fig. 2 is a vertical sectional view of the device, the clothes-line pole being shown in side elevation. Fig. 3 is a detail perspective view of the holder detached and with its cover omitted.

Corresponding and like parts are referred to in the following description and indicated in all the views of the drawings by the same reference characters.

Our improved device for holding clothes-line poles comprises a preferably-tapered hollow casing 1, which is intended to be inserted into a hole dug in the ground for it, the hole being then filled up around the casing with cement to within a comparatively short distance from the top and the said cement being then covered with earth, so that grass may grow up close to the top of the casing. The casing 1 is preferably cast and is provided with diametrically-disposed wings or nibs 2, designed to assist in holding it firmly embedded in the cement.

The casing 1 is provided at its upper end or mouth with an annular groove 3, within which a cover 4 is adapted to snugly fit, so as to close the casing when the device is not in use and down flush with the level of the ground, so that a lawn-mower may run over it without injury to the mower. If the cover be painted green on its outer side, it is evident that the entire device will be inconspicuous when not in operation. This cover 4 is preferably pivoted to the casing 1 between spaced ears 5, that are molded with the casing, and said cover is preferably provided with a loop-handle 6, or similar handle, that is adapted to be sunk into a groove in the outer face of the cover or lid when not in use. At its bottom the casing 1 is provided with an orifice 7, constituting a drain.

The casing 1 is provided on its interior with one or more bayonet-slots 8, and the pole 9 is formed in its lower tapered end, that is adapted to be inserted in said casing, with one or more lugs 10, arranged for locking engagement in said slot.

From the foregoing description, in connection with the accompanying drawings, it is manifest that we have provided a very simple and cheap and efficient holder for clothes-line poles, which will be inconspicuous when not in use and practically invisible and which will securely hold a clothes-line pole rigid when it is desired to use the latter, and it also affords a socket for the reception of the pole and so that the pole may be readily withdrawn and stored out of the way when not in use.

Having thus described the invention, what is claimed as new is—

A device for holding clothes-line poles, consisting of a tapered hollow casing adapted for the reception of a clothes-line pole, and a hinged cover connected to said casing and adapted to close the upper end thereof, said casing being provided with a pivoted handle and a groove within which said handle is adapted to lie.

In testimony whereof we affix our signatures in presence of two witnesses.

EDWIN D. COVENTRY. [L. S.]
　　　　　　　　JAMES W. ARCHER. [L. S.]

Witnesses:
　EDWIN R. LEGG,
　WILLIAM F. WENDELL.